UNITED STATES PATENT OFFICE.

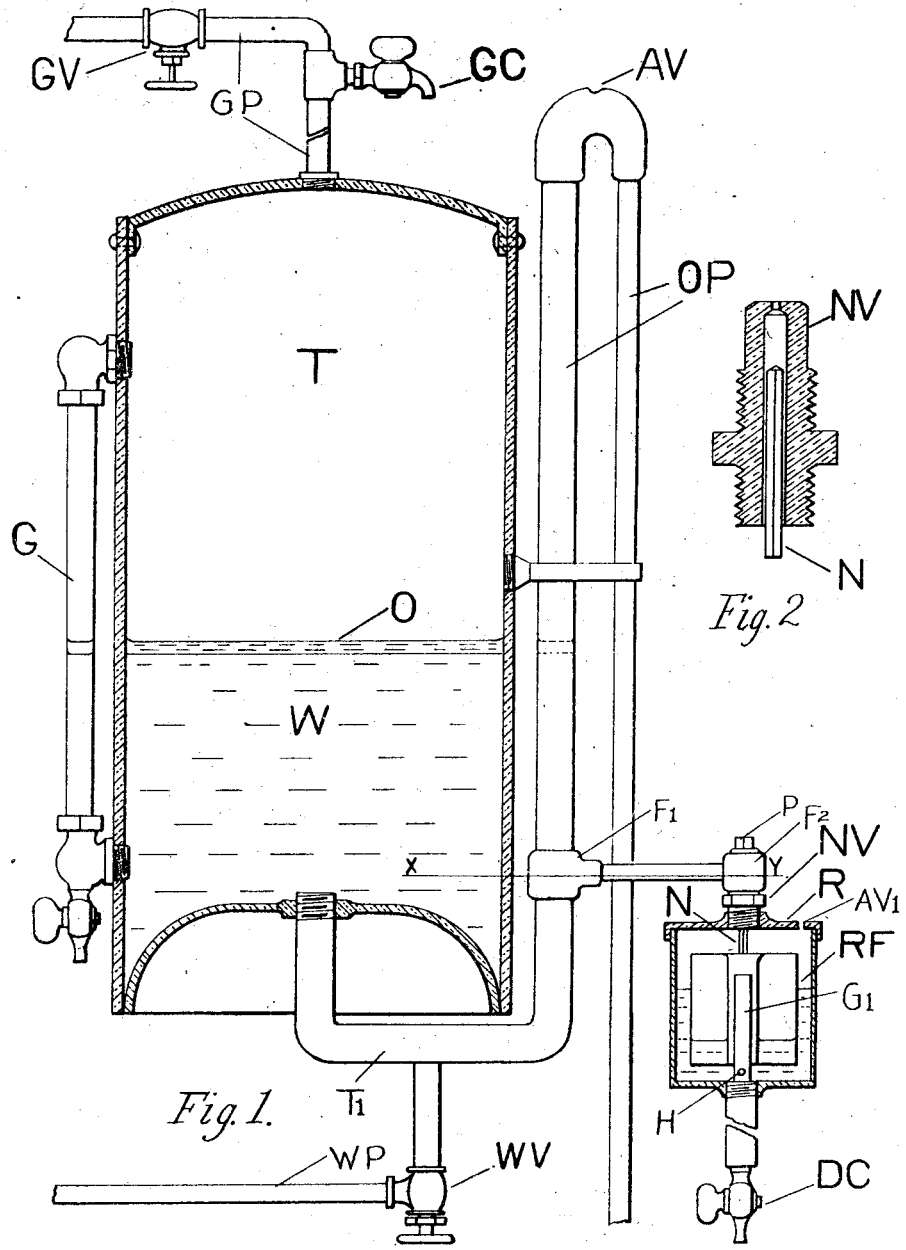

JOSEPH W. HAYS, OF CHICAGO, ILLINOIS.

GAS-COLLECTING APPARATUS.

1,141,543.  Specification of Letters Patent.  Patented June 1, 1915.

Application filed March 27, 1913. Serial No. 757,195.

*To all whom it may concern:*

Be it known that I, JOSEPH W. HAYS, a citizen of the United States, residing at Chicago, in the county of Cook and State of Illinois, have invented certain new and useful Improvements in Gas-Collecting Apparatus, of which the following is a specification.

The quality of most industrial gases is constantly fluctuating. It is often important to know the average quality of the gas covering some definite period, as for example, 24 hours. To this end various devices have been employed for slowly drawing off of a sample from a moving stream of gas in a pipe or flue, the collected sample being submitted to analysis at the end of the sampling period.

The purpose of the present invention is to obviate some of the difficulties encountered in securing a constant flow of gas into the collector vessel.

I attain the objects of my invention by the means illustrated in the accompanying drawings, in which similar letters and figures refer to similar parts throughout.

Figure 1 shows an assembled view of the entire apparatus. Fig. 2 is a cross section of a needle valve employed in connection with the flow regulator.

In Fig. 1, "T" is the gas receiving tank. The water supply pipe, "WP," connects with the trap, "T¹" and the latter with the bottom of the tank, "T," as shown. The gas conducting pipe, "GP" connects with the top of the tank and leads to the source of gas supply. It is provided with the valve "GV" and the gas outlet cock, "GC." The tank is provided with a water gage, "G" and an overflow pipe "OP" the latter being connected with the trap, "T¹." "AV" is an air vent. The overflow pipe is connected by means of a short nipple and T fittings with the needle valve, "NV," which is shown in cross-section in Fig. 2. The needle valve is screwed into the cap of the regulator, "R." The pin, "N" of the needle valve, "NV," rests upon the float, "RF" of the regulator "R." The tube "G¹" acts as a guide for the float, "RF" and is provided with a hole, "H," through which water escapes to the drip cock, "DC." "P" is a plug in the fitting "F²," which may be removed if the needle valve becomes stopped with sediment accumulations.

The apparatus is operated as follows: The tank is first partly filled with water by opening the valve, "WV" on the water pipe, "WP." A quantity of oil, "O" is then poured in on the water. The oil acts as a seal to prevent the absorption of gas by the fresh water. The oil is introduced before the pipe, "GP" is connected with the tank. When the proper gas connections are made with the top of the tank, "GC" and "WV" are closed and "GV" opened. The drip cock, "DC" is then opened and water flows from "T" through the trap, "T¹" and the needle valve, "NV" into the chamber of the regulator, "R." from whence it escapes through the hole, "H" to the drip cock, "DC." As the water rises in the chamber of "R" the float, "RF" is lifted and in turn raises the pin, "N" of the needle valve, closing the latter. As the water escapes the float is lowered and more water is admitted from "T." As the water level in "R" is substantially constant the water escapes from "DC" under constant head and pressure, rendering the outflow uniform.

"AV¹" is an air vent in the top of the regulator, "R." This is necessary to permit the proper action of the float, "RF." As the water flows out of the tank, "T," gas enters through the pipe, "GP" and is collected in the tank. The arrangement insures a constant flow of water from the tank and a constant inflow of gas.

When it is desired to draw a sample of gas from the tank for analysis, a hose connection is made with "GC." The hose runs to a gas analyzing instrument. The valve, "GV" is then closed and "WV" and "GC" opened, whereupon water flows into the tank driving the gas therefrom to the analyzer apparatus.

It is necessary to entirely fill the tank with water, driving out all of the gas that has been collected, whenever the gas in the tank is tested, as the tank of the collector must contain no gas from a previous collecting period when the apparatus is started upon the work of gathering another sample. To this end it is necessary that the oil, "O", be raised up into the pipe, "GP" but not as high as the cock, "GC", otherwise some of the oil will be wasted through "GC", making a replenishment necessary. The operator must have some means of knowing that the tank is filled to the required height and there must be positive and automatic means of preventing overflow through "GC". To this end the overflow tube, "OP" is provided. This tube connects with the trap, "T¹" as shown, rises to a point approximating the height to which the oil rises in the tube, "GP". When, in filling the tank, the water overflows through the tube, "OP", the operator knows that the tank is filled to the proper height and closes the valve, "WV". The air vent, "AV" is necessary, otherwise "OP" would act as a siphon and quickly empty the tank. When the water in the tank falls to the level, "x—y", the outflow automatically ceases. It is therefore impossible to lose the oil, "O", either through the outlet, "DC" or the gas cock, "GC".

I claim:

1. A gas collecting apparatus consisting of a vessel having a gas inlet tube at the top thereof and a water supply pipe near the bottom; an overflow tube for water connected at the bottom of said vessel and extending upward to the top of same; a trap between said overflow tube and said vessel; a tube connection on said overflow tube above said trap and a float governed waterflow regulator on said last mentioned tube.

2. A gas collecting device consisting of a vessel having a gas inlet tube at the top thereof and a water supply pipe near the bottom; a shut off valve on said gas inlet tube and another on said water supply pipe; a discharge tube near the bottom of said tank; a flow regulator and a valve on said discharge tube; a trap in said discharge tube and an overflow tube connected therewith.

3. A gas collecting apparatus consisting of a tank having a pipe connection at the top with inlet and outlet valves for gas; an inlet tube for water near the bottom of the tank having a shut-off valve thereon; a water outflow regulator; a tube connecting said tank with said water outflow regulator and a valve in said tube governed by said outflow regulator.

4. A gas collecting apparatus consisting of a tank having two tube connections, the one at the top and the other at the bottom; a shut off valve on each of said tube connections; a branch tube on said bottom tube at a point between the tank and the valve on said bottom tube; a float governed waterflow regulator on said branch tube whereby the head of water in said regulator is maintained at constant level irrespective of the level of the water in said tank.

JOSEPH W. HAYS. [L. S.]

Witnesses:
HARVEY G. HAYS,
MINNIE LEVINGER.